(12) United States Patent
Kobayashi

(10) Patent No.: US 9,577,225 B2
(45) Date of Patent: Feb. 21, 2017

(54) MANUFACTURING METHOD FOR SQUARE BATTERY AND SQUARE BATTERY

(71) Applicant: TOYOTA JIDOSHA KABUSHIKI KAISHA, Toyota-shi, Aichi-ken (JP)

(72) Inventor: Keiichiro Kobayashi, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/106,464

(22) PCT Filed: Dec. 12, 2014

(86) PCT No.: PCT/IB2014/002755
§ 371 (c)(1),
(2) Date: Jun. 20, 2016

(87) PCT Pub. No.: WO2015/097512
PCT Pub. Date: Jul. 2, 2015

(65) Prior Publication Data
US 2016/0336550 A1  Nov. 17, 2016

(30) Foreign Application Priority Data

Dec. 25, 2013  (JP) .................................. 2013-268061

(51) Int. Cl.
H01M 2/06 (2006.01)
H01M 2/04 (2006.01)
H01M 2/30 (2006.01)

(52) U.S. Cl.
CPC .......... *H01M 2/0439* (2013.01); *H01M 2/0426* (2013.01); *H01M 2/0473* (2013.01); *H01M 2/305* (2013.01); *H01M 2220/20* (2013.01)

(58) Field of Classification Search
CPC  H01M 2/0439; H01M 2/0426; H01M 2/0473; H01M 2/305
See application file for complete search history.

(56) References Cited

U.S. PATENT DOCUMENTS 3,713,896 A * 1/1973 Feldhake ................ H01M 2/08
29/623.2

FOREIGN PATENT DOCUMENTS

| JP | 2002-184365 A | 6/2002 |
| JP | 2010-282847 A | 12/2010 |
| JP | 2013-041752 A | 2/2013 |

* cited by examiner

*Primary Examiner* — Helen O Conley
(74) *Attorney, Agent, or Firm* — Sughrue Mion, PLLC

(57) ABSTRACT

A manufacturing method for a square battery includes: a first process in which an outer terminal and an outer side resin member that separates the outer terminal and an outer surface of a lid body are assembled to the lid body; a second process in which a laser beam is irradiated from the outer surface side of the lid body to weld the lid body to the case body by laser after the first process; and a third process in which the outer side resin member is expanded after the second process.

9 Claims, 9 Drawing Sheets

MANUFACTURING METHOD FOR SQUARE BATTERY AND SQUARE BATTERY

BACKGROUND OF THE INVENTION

1. Field of the Invention

The present invention relates to a manufacturing method for a square battery and a square battery.

2. Description of Related Art

A battery in, a mode that an electrode body including a positive electrode and a negative electrode is housed in an outer case has been known. In one representative configuration of the battery with such a configuration, the above outer case includes a case body and a lid body that is welded to the case body. As a welding method, a laser welding method can preferably be adopted. As technical literature on this type of the battery, Japanese Patent Application Publication No. 2010-282847 (JP 2010-282847 A) and Japanese Patent Application Publication No. 2013-041752 (JP 2013-041752 A) are raised.

In a battery disclosed in JP 2010-282847 A, an electrode terminal is pulled out of a through hole (a terminal pullout hole) of a lid body, and the electrode terminal and an outer surface of the lid body are separated and insulated from each other by an outer side resin member. Contact portions (that is, weld sections) of the case body and the lid body are provided on a side of the lid body, that is, a side surface side of the case body. When it is assumed that these contact portions are located on an outer surface side of the lid body, laser welding can be performed by irradiating a laser beam to the above contact portion from one direction on the outer surface side of the lid body. This is advantageous from a perspective of improved productivity of the battery and the like.

SUMMARY OF THE INVENTION

As described above, when the laser welding is performed by irradiating the laser beam from the outer surface side of the lid body, if the outer side resin member is arranged on the outer surface of the lid body, the above outer side resin member is more likely to be influenced by the laser beam as a distance from an outer edge of the outer side resin member to the welded section is reduced. For example, when the outer side resin member absorbs the laser beam, alteration (thermal deformation, discoloration, or the like) of the outer side resin member by heat can occur. Meanwhile, an outer shape of the outer side resin member (dimensions of each section and the like) is generally designed in consideration of a length of an insulation distance that allows to exert a desired insulation performance during use of the battery, mechanical strength and durability that are demanded for the outer side resin member, and the like. Accordingly, there may be a case where it is difficult to secure the sufficient distance from the outer edge of the outer side resin member to the welded section.

The present invention provides a manufacturing method for a square battery that can reduce an influence of a laser beam on an outer side resin member in a case where a lid body, having the outer side resin member, arranged on an outer surface is welded from the outer surface side by laser. In addition, the present invention provides a square battery in which a lid body having an outer side resin member on an outer surface is welded from the above outer surface side by laser and in which an influence of a laser beam to the above outer side resin member is reduced.

A first aspect of the present invention is a manufacturing method for a square battery. The square battery includes a case body and a lid body welded to the case body. The manufacturing method includes: a first process in which an outer terminal and an outer side resin member that separates the outer terminal and an outer surface of the lid body are assembled to the lid body; a second process in which a laser beam is irradiated from the outer surface side of the lid body to weld the lid body to the case body by laser after the first process; and a third process in which the outer side resin member is expanded after the second process. According to the above aspect, it is possible to secure an appropriate insulation distance (for example, a creeping distance) in the outer side resin member after the expansion. In addition, during the laser welding before the expansion, a distance between an outer edge of the outer side resin member and a welded section is increased to be larger than that after the expansion. In this way, an influence of the laser beam on the outer side resin member during the laser welding (for example, alteration by heat) can be reduced.

In the above aspect, the above third process may include a process in which the outer side resin member is expanded by absorbing moisture. The above third process may be a process in which a water absorption rate of the outer side resin member is increased to be higher than the water absorption rate of the outer side resin member in the above second process. For example, the third process may include a process in which the moisture is absorbed to the outer side resin member such that a water absorption rate of the outer side resin member increases from 1% or lower to higher than 1% on a mass basis.

Noted that, unless otherwise noted, the water absorption rate in this specification means the water absorption rate on the mass basis. This water absorption rate can be calculated as a ratio of a weight increase by water absorption to a weight $M_0$, the weight $M_0$ after the outer side resin member is heated at 100° C. under a pressure-reduced condition of 0.1 kPa or lower for five hours being a reference. In other words, when a weight of the outer side resin member as a measuring subject is set to $M_1$, the water absorption rate of the outer side resin member can be calculated by the following equation. The water absorption rate (%)=(($M_1$−$M_0$)/$M_0$)×100

In the above aspect, the manufacturing method may include a forth process in which the outer side resin member is dried before the second' process. According to the above aspect, it is possible by compressing the outer side resin member to increase the distance between the outer edge of the outer side resin member and the welded section during the laser welding. When the above outer side resin member absorbs the moisture in the above third process, the above drying processing may be performed before the above second process. Drying of the outer side resin member can preferably be performed by, for example, heating the outer side resin member under the reduced pressure.

As the outer side resin member, for example, the one that includes a resin material with a polyamide resin as a base (a polyamide resin based resin material) may be adopted. In general, the polyamide resin has a superb water absorption property, and also a volume change due to a difference in the water absorption rate is significant. Thus, according to the outer side resin member that includes the polyamide resin based resin material, the distance between the outer edge of the outer side resin member and the welded section can effectively be adjusted through the water absorption rate of the outer side resin member.

A second aspect of the present invention is a square battery. The square battery includes: a case body including an opening; a lid body fixed to the opening of the case body; an electrode body housed in the case body; an electrode terminal configured to be electrically connected to the electrode body and configured such that a portion of the electrode terminal is exposed to the outside of the lid body; and an outer side resin member that separates the electrode terminal and an outer surface, of the lid body. Contact portions of an outer edge of the lid body and the case body are welded by laser from the outer surface side of the lid body in a state that the outer side resin member is temporarily deformed, so as to increase a distance between an outer edge of the outer side resin member and the contact portions. Here, the above state that the outer side resin member is temporarily deformed refers to a state that the outer side resin member is deformed with a shape of the above outer side resin member in the square battery being a reference. In addition, the increased distance between the outer edge of the outer side resin member and the contact portions means that this distance is longer than a distance at the same position in the square battery. Such a square battery can include the outer side resin member in such dimensions that an influence of a laser beam for welding the lid body and the case body is reduced and thus an appropriate creeping distance can be obtained.

In the above aspect, the state that the outer side resin member is temporarily deformed may be a state that the outer side resin member is temporarily compressed. The above state that the outer side resin member is temporarily compressed means a state that the outer side resin member is further compressed with an outer shape of the above outer side resin member in the square battery being a reference. The above temporarily compressed state can preferably be realized, for example, by reducing the water absorption rate of the outer side resin member on purpose. The above outer side resin member can be expanded when the outer side resin member absorbs the moisture after the laser welding. Due to this expansion, the creeping distance is extended, and thus insulation performance can be improved.

In the above aspect, the battery further may include a bolt including a head section and a leg section. The bolt may be arranged such that the leg section thereof is inserted through a bolt insertion hole provided on an outer side end of the electrode terminal. Here, the outer side end of the electrode terminal is typically an end of a portion of the electrode terminal that is exposed to the outside of the lid body. The outer side resin member is provided with a bolt receiving hole that receives the head section of the bolt and restricts rotation of the bolt. According to such a configuration, for example, an operation to attach a nut to the above bolt and fasten a connection member with an external circuit or an electrode of another adjacent battery can efficiently and reliably be performed.

A third aspect of the present invention is a manufacturing method for a square battery. The square battery includes: a case body having an opening; a lid body fixed to the opening of the case body; an electrode body housed in the case body; an electrode terminal configured to be electrically connected to the electrode body and configured such that a portion of the electrode terminal is exposed to the outside of the lid body; and an outer side resin member that separates the electrode terminal and an outer surface of the lid body. The manufacturing method includes welding contact portions of an outer edge of the lid body and the case body by laser from the outer surface side of the lid body in a state that the outer side resin member is temporarily deformed, so as to increase a distance between an outer edge of the outer side resin member and the contact portions.

In addition, according to this specification, any of the batteries disclosed herein is a, single battery, and a battery pack that includes the plural single batteries is provided. Terminals between these single batteries are connected via a connection member. In a preferred aspect, the above single battery may be a square battery in a mode that includes the above bolt, and the connection member is fastened to the outer side end of the electrode terminal when the leg section of the bolt is inserted through the bolt insertion hole of the connection member and the nut is fastened. In the battery pack in such a mode, since rotation stop of the bolt can appropriately be performed, the above nut can reliably be fastened. Thus, connection resistance between the single batteries can be small.

Figure 9:
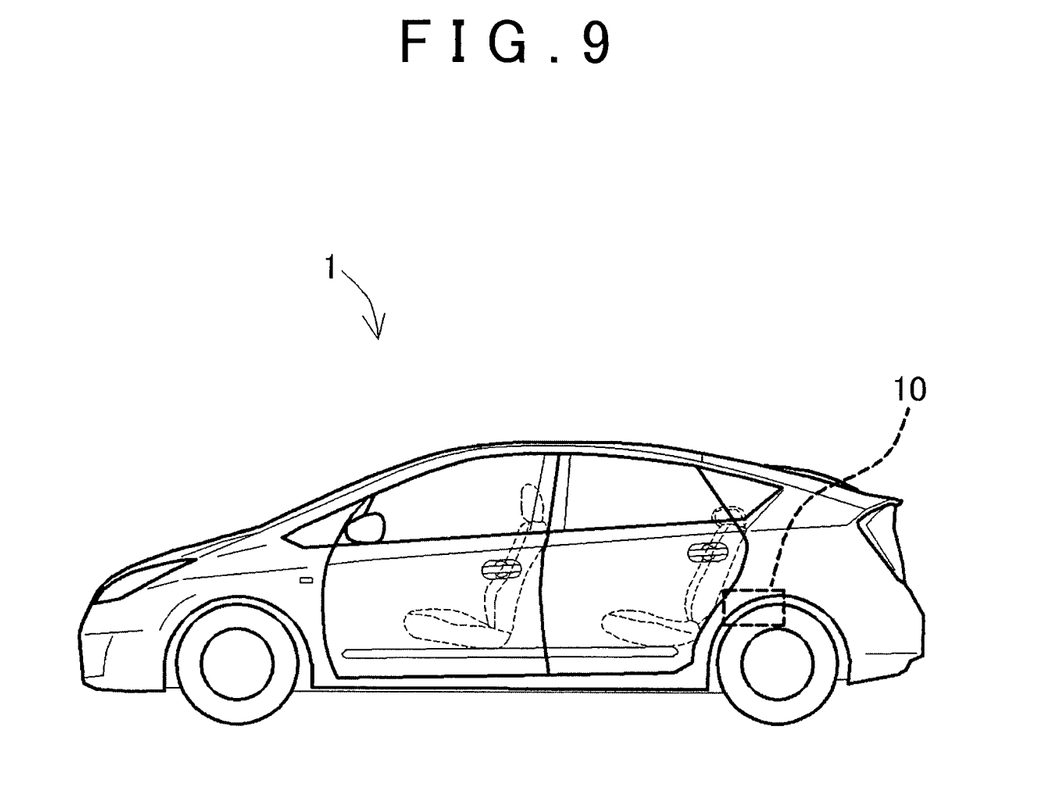
FIG. 9 is a schematic side view of a vehicle (an automobile) in which the square battery according to the one embodiment is installed.

The square battery disclosed herein can preferably be used as a power supply for a motor (an electric motor) that is installed in a vehicle such as an automobile, for example. Thus, as another aspect of the present invention, for example, as schematically shown in FIG. 9, a vehicle (typically an automobile, for example, a hybrid vehicle, an electric vehicle, or the like) 1 that includes such a battery 10 (typically, a battery pack that is formed by connecting plural pieces of the batteries 10 in series) as a drive power supply is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on a preferred embodiment of the present invention. Noted that matters that are other than the items particularly mentioned in this specification but are necessary to carry out the present invention could be understood as design matters of those skilled in the art that are based on conventional techniques in the subject field. The present invention can be carried, out on the basis of the details disclosed in this specification and common technical knowledge in the subject field.

As a subject to which a technique disclosed herein is preferably applied, a square battery can be raised, in which an outer case in a flat square shape (that is, in a flat cuboid shape) is formed by: a case body having an opening; and a lid body welded to a peripheral edge of the opening of the case body, and in which the above lid body constitutes one of narrow surfaces of the above outer case. In the battery in such a mode, since the lid body has an elongated shape, there is a tendency that a distance between an outer edge of the lid body (that is, a welded section of the lid body and the case body) and an outer side resin member that is arranged on an outer surface of the lid body is reduced. For this reason, application of the technique disclosed herein is particularly meaningful.

Although there is no particular intention to impose any restriction, the present invention will hereinafter be described in details with an example of a case where the present invention is primarily applied to a lithium-ion secondary battery that includes a flat square-shaped outer case and to a manufacturing method for the lithium-ion secondary battery. Noted that members and portions that exert the same effects may be denoted by the same reference numerals in the drawings described below, and repetitive descriptions thereof may not be made. In addition, dimensional relationships (a length, a width, a thickness, and the like) in the each drawing do not necessarily reflect actual dimensional relationships.

Figure 1:
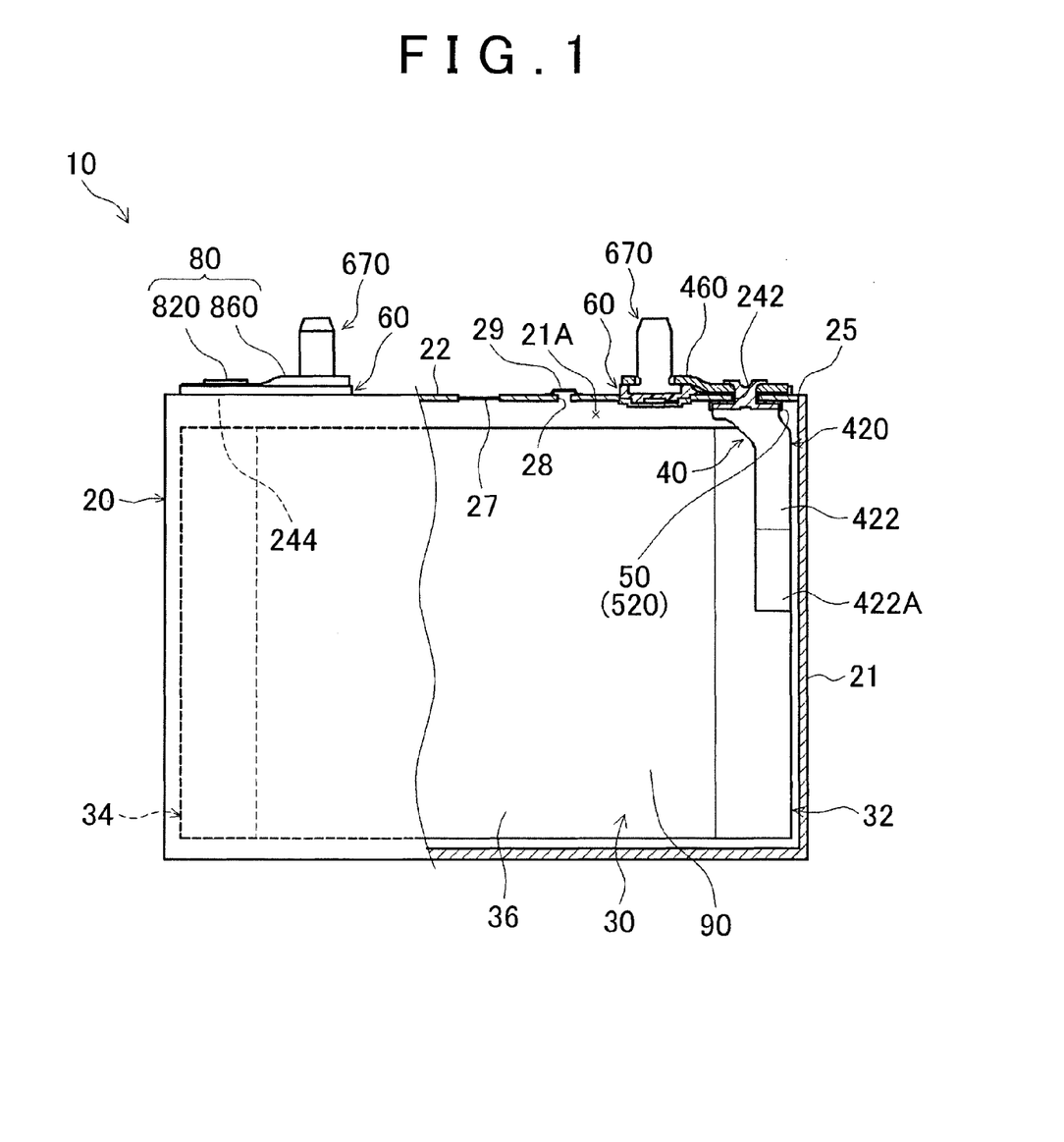
FIG. 1 is a partial cross-sectional view of a square battery according to one embodiment.
Figure 2:
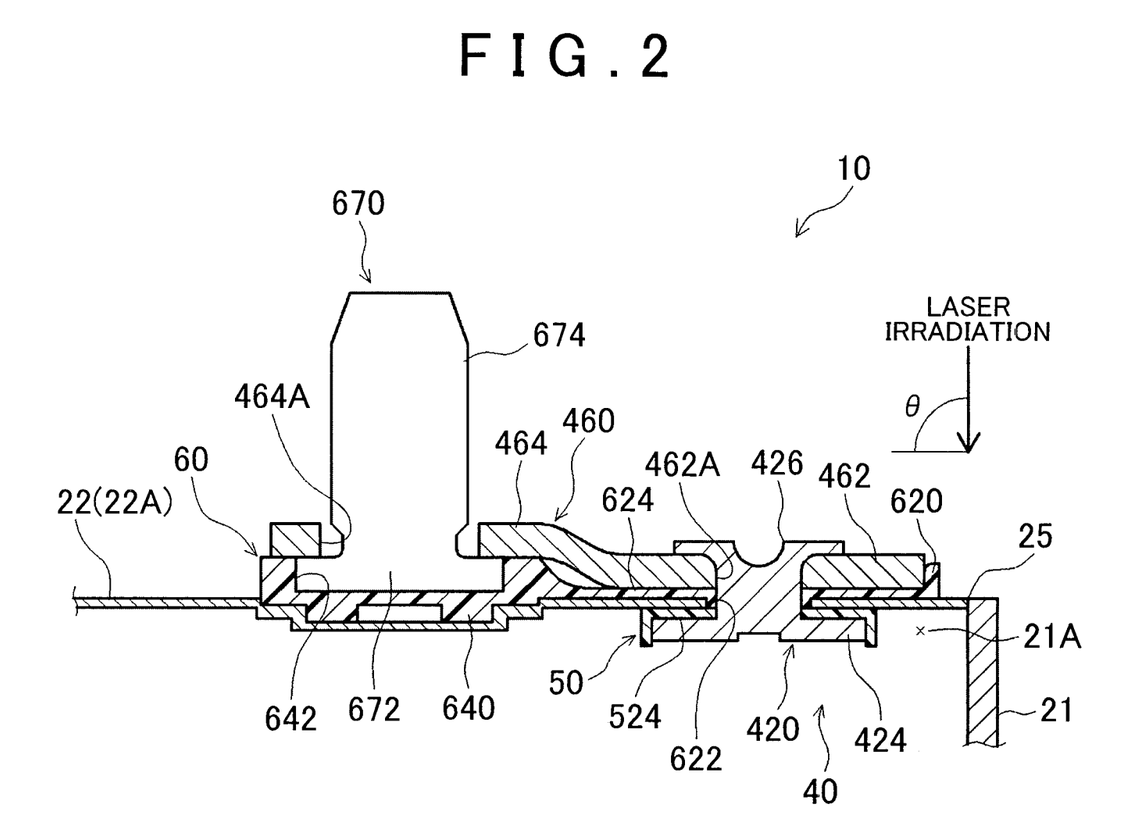
FIG. 2 is a cross-sectional view in which a portion of FIG. 1 is enlarged.

FIG. 1 and FIG. 2 show a schematic configuration of a lithium-ion secondary battery that is manufactured by this embodiment. This lithium-ion secondary battery 10 has a configuration in which a wound electrode body 30 equipped with a specified battery constituent material is housed together with an adequate electrolyte 90 in an outer case 20 in a flat square shape.

The outer case 20 includes: a bottomed square-cylindrical case body 21 that has an opening 21A in one of narrow width surfaces in the above flat cuboid shape; and a lid body 22 for closing the opening. More specifically, the lid body 22 is fitted to the opening 21A of the case body 21, and contact portions 25 of an outer edge of an outer surface 22A of the lid body 22 and a portion of the case body 21 around the opening 21A are welded by laser, and the lid body 22 is thereby fixed to the case body 21. As shown in FIG. 2, the above laser welding is performed by irradiating a laser beam from the outer surface 22A side of the lid body 22. Here, irradiating the laser beam from the outer surface 22A side of the lid body 22 means irradiating the laser beam in a non-parallel direction with this outer surface 22A, that is, in a direction that crosses the outer surface 22A. The above laser beam is typically irradiated from an upper side of the contact portions 25 (an upper side in FIG. 2). As shown in FIG. 2, generally, an angle θ that is defined by an irradiating direction of the laser beam and the outer surface 22A of the lid body is appropriately set about 60 degrees to 120 degrees when seen in a cross section that is perpendicular to an extending direction of the contact portions 25. When θ is too small, there may be a case where the laser beam is blocked by an outer side resin member 60 and thus is difficult to be irradiated onto the contact portions 25. On the other hand, when θ is too large, there may be a case where the outer side resin member 60 is easily heated by a reflected light of the laser irradiation or the like. Thus, the above θ is preferably set about 75 degrees to 105 degrees (for example, 75 degrees to 90 degrees).

A material that constitutes the outer case 20 is not particularly limited as long as the contact portions (weld sections) 25 between the case body 21 and the lid body 22 can be joined by welding. For the material that constitutes the outer case 20, the same material as that used for a general battery or the like can appropriately be used. From a perspective of heat radiation and the like, the outer case 20, in which almost all of the case body 21 and the lid body 22 are made of metal (for example, made of aluminum, made of stainless steel (SUS), made of steel, or the like), can preferably be adopted. The technique disclosed herein can preferably be applied to a battery in which almost all of the case body 21 and the lid body 22 are made of aluminum. Since aluminum has higher thermal conductivity (is more likely to lose heat) than SUS and the like, energy required for the laser welding tends to be high. According to the technique disclosed herein, even in a mode of welding in which high energy is applied as described above, alteration of the outer side resin member can effectively be prevented.

An outer shape of the lid body 22 is a substantially rectangular shape that conforms to a shape of the opening 21A (an opening shape of the case body 21). The technique disclosed herein can preferably be applied to a battery in which a width W0 (see FIGS. 4, 6) of the lid body 22 is approximately 10 mm to 28 mm (preferably, 10 mm to 15 mm), for example. In the battery in which the width W0 of the lid body 22 is relatively narrow as described above, a distance D1 (see FIG. 4) from an outer edge of the outer side resin member 60 to the seam (the welded section) 25 tends to be short in a width direction of the lid body 22. For this reason, the application of the technique disclosed herein is particularly meaningful. The lid body 22 in this embodiment has the rectangular shape with the width (W0) of 12.5 mm and a length of 136 mm. A safety valve 27 is provided at the center of the lid body 22, the safety valve 27 communicating between the inside and the outside of the case to release an internal pressure of the case 20 when the internal pressure is increased.

Although not particularly limited, a thickness (a plate thickness) of the lid body 22 can be set about 0.3 mm to 2 mm (typically, 0.5 mm to 2 mm), for example. The thickness of the lid body 22 may be 0.5 mm or larger but smaller than 1.5 mm. In addition, a thickness (a plate thickness) of the case body 21 can be set about 0.5 mm to 3 mm, for example. The thickness of the case body 21 is typically 1 mm to 3 mm. In the battery 10 according to this embodiment, a plate thickness of an aluminum material that constitutes the case body 21 is 0.4 mm, and a plate thickness of an aluminum material that constitutes the lid body 22 is 0.7 mm.

The wound electrode body 30 is housed in the case body 21 in such a posture that a winding axis thereof is laid sideways. Similar to a wound electrode body of a general lithium-ion secondary battery, the wound electrode body 30 can be manufactured by laminating a sheet-like positive electrode (a positive electrode sheet) 32 and a sheet-like negative electrode (a negative electrode sheet) 34 together with a total of two pieces of sheet-like separators (separator sheets) 36, winding a laminated body in a longitudinal direction, pressing and denting the thus-obtained wound body in a side surface direction.

A material and a member themselves that constitute the wound electrode body 30 can be the same as those used for the electrode body that is provided in a conventional lithium-ion secondary battery, and thus are not particularly limited. The wound electrode body 30 of this embodiment includes: the positive electrode sheet 32 that has a positive electrode active material layer on a long positive electrode current collector (for example, aluminum foil); the negative electrode sheet 34 that has a negative electrode active material layer on a long negative electrode current collector (for example, copper foil); and a porous polyolefin based resin sheet as the separator sheet 36. For each of a positive electrode active material and a negative electrode active material, one type or two or more types of materials that have conventionally been used for the lithium-ion secondary battery can be used with no particular limitation. In this embodiment, $LiNiO_2$ is used as the positive electrode active material, and natural graphite is used as the negative electrode active material.

Figure 6:
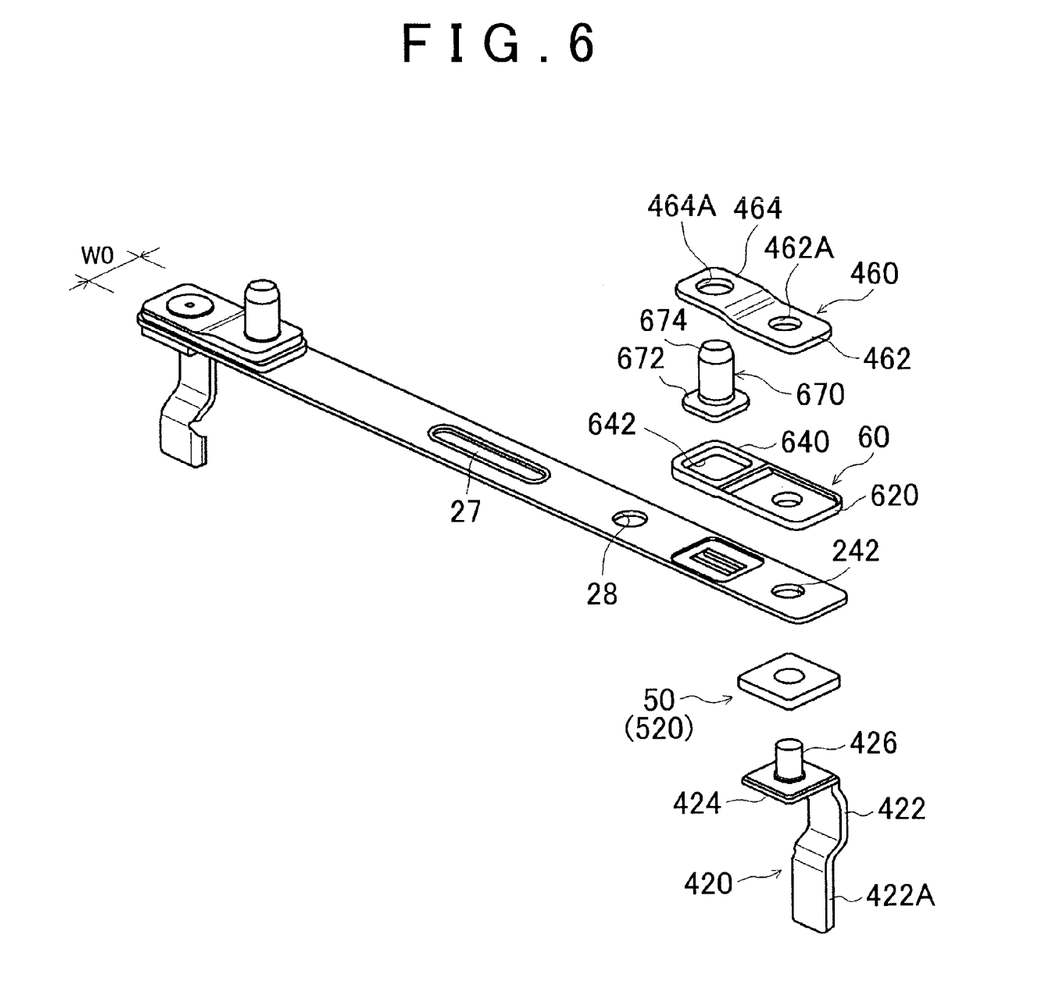
FIG. 6 is an exploded perspective view of a lid body and an electrode terminal of the square battery according to the one embodiment.

A positive electrode terminal 40 and a negative electrode terminal 80 are respectively connected to the positive electrode sheet 32 and the negative electrode sheet 34. These electrode terminals 40, 80 are configured to respectively penetrate positive electrode and negative electrode terminal pullout holes (through holes) 242, 244 and be pulled out from the inside of the outer case 20 to the outside, the terminal pullout holes 242, 244 being respectively provided at one end and another end in a longitudinal direction of the lid body 22. As shown in FIGS. 1, 2, 6, the positive electrode terminal 40 has such a configuration that a positive electrode inner terminal 420 that is mainly positioned on the inside of the outer case 20 and a positive electrode outer terminal 460 that is mainly positioned on the outside of the outer case 20 are connected. Similarly, the negative electrode terminal 80 has such a configuration that a negative electrode inner terminal 820 and a negative electrode outer terminal 860, which are substantially formed in the same shapes as those on the positive electrode side, are connected (see FIG. 1).

A lower end 422A of the positive electrode inner terminal 420 is connected to the positive electrode sheet 32 by ultrasonic welding, for example. The positive electrode inner terminal 420 includes: a plate-shaped (strip-shaped) first lead section 422, a plate-shaped second lead section 424, and a projected section 426. The first lead section 422 is configured to extend substantially perpendicular from the lower end 422A to the lid body 22. The second lead section 424 is configured to be formed in a continuous manner from an upper end of the first lead section, be bent approximately at a right angle from the upper end (from the front to the back side of the drawing in FIG. 2), and spread substantially parallel to an inner surface of the lid body 22. The projected section 426 is configured to extend substantially perpendicular from the center of a plate surface of the second lead section to an outer direction of the battery. The projected section 426 is configured as a rivet section. The above rivet section penetrates the terminal pullout hole 242 and a through hole (a rivet hole) 462A of the positive electrode outer terminal 460 and is riveted, and the positive electrode inner terminal 420 and the positive electrode outer terminal 460 are thereby connected (fastened). As a constituent material of the positive electrode inner terminal 420 and the positive electrode outer terminal 460, a metallic material with superb conductivity is preferred, and aluminum is typically used.

The positive electrode outer terminal 460 has a first connection section 462 and a second connection section (an outer side end) 464. The first connection section 462 has the through hole 462A-through which the projected section 426 can be inserted before the above riveting. The second connection section 464 is formed in a continuous manner from the first connection section 462 to the center side in the longitudinal direction of the lid body 22, and is lifted outward of the outer case 20 in a step shape. As shown in FIG. 6, the second connection section 464 is provided with a bolt insertion hole 464A, through which a leg section 674 of a bolt 670 can be inserted. The leg section 674 of the bolt 670 penetrates the bolt insertion hole 464A from below to above, a connection member 112 for external connection is attached to the leg section 674, which is projected upward from the second connection section 464, and is a nut 113 fastened. In this way, the connection member 112 can be coupled (fixed) to the positive electrode outer terminal 460 (see FIG. 7, FIG. 8).

The above riveting is performed in a state that an inner side resin member 50 is interposed between a wall surface of the lid body 22 that surrounds the terminal pullout hole 242 and the second lead section 424 and that the outer side resin member 60 is further interposed between the wall surface and the first connection section 462 of the outer terminal. Due to such riveting, the positive electrode terminal 40 is fixed to the lid body 22, and the terminal pullout hole 242 is sealed by compressing the inner side resin member 50 between the lid body 22 and the second lead section 424.

Figure 3:
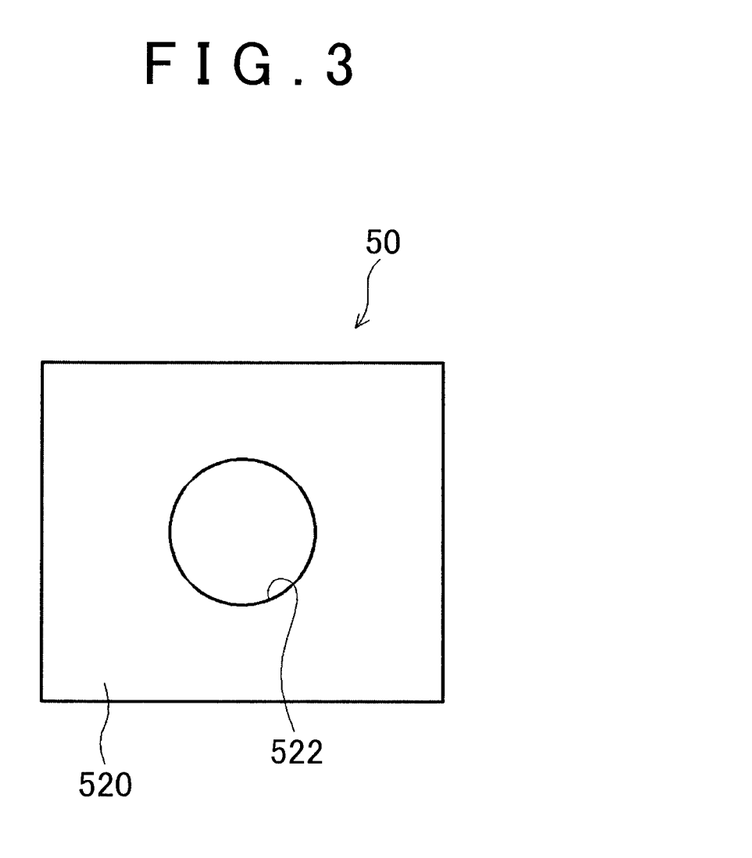
FIG. 3 is a plan view of an inner side resin member according to the one embodiment.

The inner side resin member 50 has an attachment section 520 that is provided with an opening 522, through which the projected section 426 of the inner terminal 420 is inserted. The attachment section 520 insulates the inner terminal 420 (the second lead section 424) and the lid body 22 when a portion surrounding the opening 522 is interposed between the lid body 22 and the second lead section 424 and is compressed, and also seals the terminal pullout hole 242. A lower surface (a surface on the electrode body side) of the attachment section 520 is provided with a recess 524 that can receive the second lead section 424 of the inner terminal 420 from below (that is, from the inside of the case). This recess 524 is provided such that a lower end surface of the second lead, section 424 is housed in the inside of the recess 524. In this way, it is possible to avoid contact of an outer periphery of the electrode body 30 with the second lead section 424. In addition, the inner terminal 420 (the second lead section 424) and the case body 21 can further reliably be insulated.

As a constituent material of the inner side resin member 50, any of various types of resin materials that show resistance to the electrolyte to be used can appropriately be selected. For example, a resin material with a resin, such as a polyphenylene sulfide resin (PPS), a polyimide resin, a polyamideimide resin, a polyether ether ketone resin (PEEK), a polyether ketone ketone resin (PEKK), or a polyether sulfone resin (PES), being a base (typically, a resin material having a composition in which the above base resin occupies more than 50% by mass of a resin component), can preferably be adopted. Alternatively, the inner side resin member 50 may be formed of the same resin material as that of the outer side resin member 60, which will be described below. The inner side resin member 50 according to this embodiment is formed of PPS.

Figure 4:
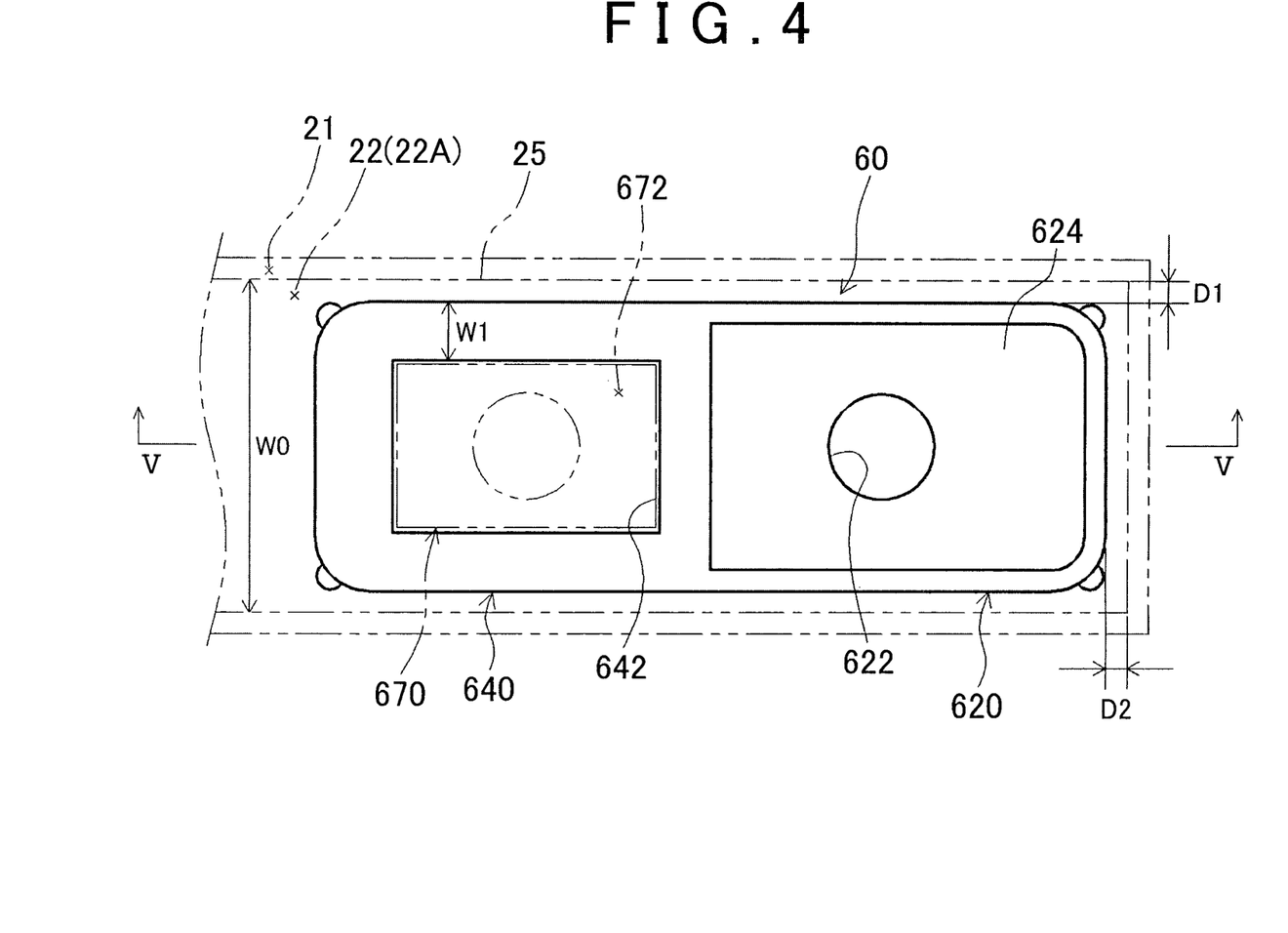
FIG. 4 is a plan view of an outer side resin member according to the one embodiment.
Figure 5:
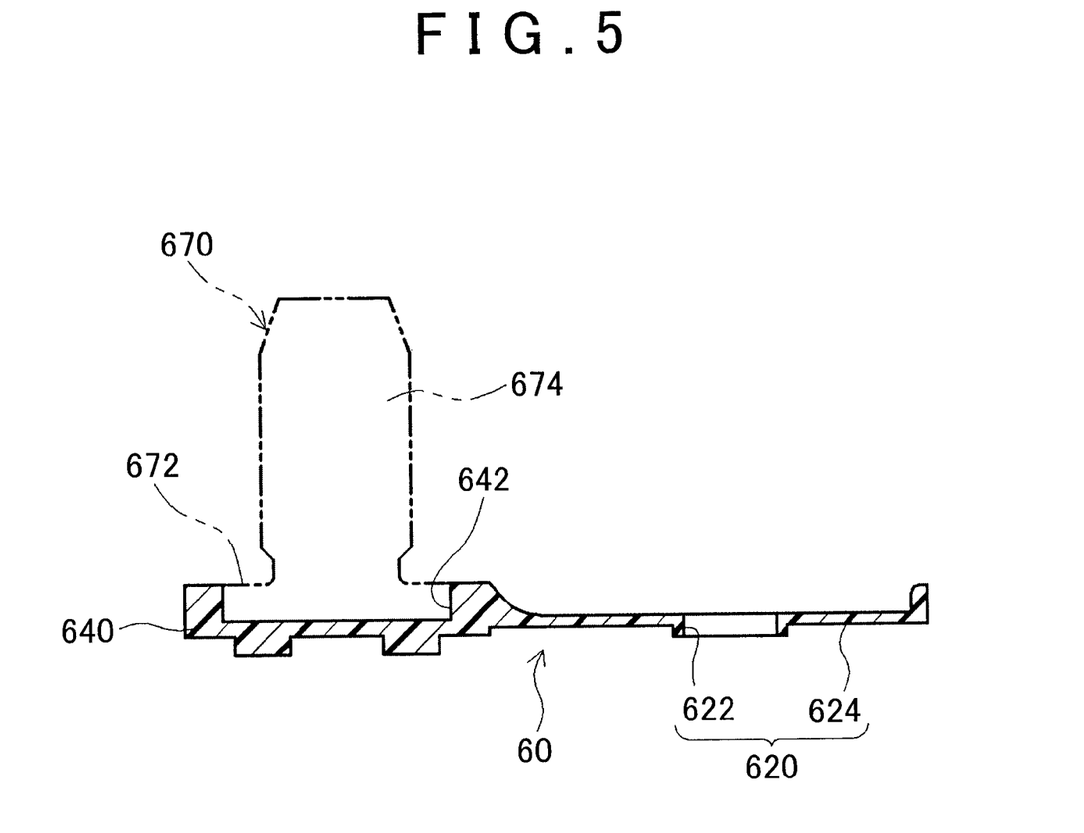
FIG. 5 is a cross-sectional view taken along the V-V line in FIG. 4.

The outer side resin member 60 has an attachment section 620 and an extended section 640. The attachment section. 620 is interposed between the wall surface of the lid body 22, which surrounds the terminal pullout hole 242, and the first connection section 462 of the outer terminal. The extended section 640 is configured to extend in a space between the second connection section 464 of the outer terminal and the lid body 22. The attachment section 620 has a cylinder section 622 and a dish section 624. The cylinder section 622 is configured to be inserted in the terminal pullout hole 242 from the outside, so as to inhibit direct contact (insulate) between the projected section 426 and the lid body 22. The dish section 624 is configured to be formed in a continuous manner from the cylinder section 622 and spread along the outer surface of the lid, body 22. The first connection section 462 of the outer terminal is arranged in a manner to correspond to a recess of this dish section 624.

The extended section 640 is provided with a bolt receiving hole 642 that has a rectangular opening shape with a longitudinal direction of the outer side resin member 60 (corresponding to the longitudinal direction of the lid body 22) being a long side and that can receive a head section 672 of the bolt 670. The head section 672 is formed such that a shape thereof in a cross section that is perpendicular to an axis of the bolt 670 is a slightly smaller rectangular shape than the opening shape of the bolt receiving hole 642. The bolt 670 is arranged (attached) such that rotation thereof is restricted by insertion of the head section 672 in the bolt receiving hole 642 (co-rotation is inhibited) and that the leg section 674 is projected through the bolt insertion hole 464A.

As a constituent material of the outer side resin member, any of various types of insulating resin materials can appropriately be selected and used. For example, a resin material with a resin, such as polyamide, polyacetal (POM), tetrafluoroethylene-perfluoroalkyl vinyl ether resin (PFA), a methacrylic resin, PPS, a polyimide resin, a polyamideimide resin, PEEK, PEKK, PES, a urea resin, a phenol resin, and a melamine resin, being a base can preferably be adopted. Alternatively, a resin material with a resin being the base may be used, examples of the resin including: a polyolefin-based resin or such as polypropylene (PP) and polyethylene (PE); fluororesin, such as perfluoroalkoxy alkane (PFA) and polytetrafluoroethylene (PTFE); and the like.

As a preferred example of the constituent material of the outer side resin member, a non-aromatic resin material, that is, a resin material with a non-aromatic resin being a base can be raised. Here, the non-aromatic resin refers to a resin that has no aromatic ring (typically, a benzene ring). As specific examples of the non-aromatic resin, aliphatic polyamide, such as, nylon 6 (PA6) and nylon 66 (PA66), and a methacrylic resin, such as POM, PFA, and polymethyl methacrylate (PMMA), can be raised. Of these, one type can be used independently, or combination of two types or more can be used. Such a non-aromatic resin material generally has high resistance to the alteration that is caused by the laser beam during the laser welding (typically, is less likely to absorb the scattered laser beam). Use of a resin material, whose heat resistant temperature based on a method for load deflection temperature measurement (0.45 MPa) is 150° C. or higher (more preferably, 250° C. or higher), is preferred.

As another preferred example of the constituent material of the outer side resin member, a resin material with the resin, such as aliphatic polyamide, the urea resin, the phenol resin, or the melamine resin, being the base can be raised. The outer side resin member that is formed by using any of these resin materials can exhibit a relatively superb water absorbing property. Accordingly, the above outer side resin member can effectively be expanded or compressed by adjusting a water absorption rate of the outer side resin member. For example, when the outer side resin member absorbs moisture after the laser welding, the outer side resin member can significantly be expanded in comparison with that during the laser welding. By using this characteristic, the distance from the outer edge of the outer side resin member to the welded section during the laser welding can be increased to be longer than that during use of a square battery, for example. From such a perspective, as the resin material that constitutes the outer side resin member, a resin material whose equilibrium water absorption rate ($A_E$; on a mass basis) at 23° C. and relative humidity of 60% is higher than 1% is preferred, a resin material whose equilibrium water absorption rate is higher than 1.5% is further preferred, and a resin material whose equilibrium water absorption rate is higher than 2.0% is even further preferred. An upper limit of the above equilibrium water absorption rate ($A_E$) is not particularly set. From a perspective of dimensional stability and the like, 10% or lower of the equilibrium water absorption rate is generally appropriate, and, for example, 5% or lower is preferred.

In the technique disclosed herein, as the resin material that constitutes the outer side resin member, a resin material with aliphatic polyamide, such as nylon 6 or nylon 66, being the base can particularly preferably be adopted. Here, for the resin material with aliphatic polyamide being the base, a ratio of aliphatic polyamide to the resin component contained in the resin material is higher than 50% by mass and is typically higher than 70% by mass. The resin material may contain the resin component that is substantially composed of aliphatic polyamide.

Noted that a type of the resin that is contained in the resin material for constituting the outer side resin material can be identified by combining and applying general analytical methods, such as infrared (IR) spectrum analysis and pyrolytic gas chromatography, when necessary. In a case where the outer side resin material contains plural types of the resin, a compounding ratio thereof can be understood from a result of the above analysis and specific gravity of the outer side resin member. The same applies to the inner side resin material.

Although not particularly limited, in this embodiment, the bolt 670 having the rectangular head section 672 is adopted. Then, the outer side resin member 60 is provided with the rectangular bolt receiving hole 642, which corresponds to the shape of the bolt head section 672, such that the long side thereof is along the longitudinal direction of the outer side resin member 60. According to such a configuration, compared to a pair of a general hexagonal bolt head section and a hexagonal bolt receiving hole that corresponds to the shape of the bolt head section, for example, a large width W1 (see, FIG. 4) from the bolt receiving hole 642 to the outer edge of the outer side resin member 60 can be secured even with the same seat area of the bolt 670. In this way, while the seat area of the bolt 670 is increased to reduce connection resistance, the outer side resin member 60 that has sufficient mechanical strength against the rotation stop of the bolt 670 and another external force can be realized. Such a reduction of the connection resistance is particularly meaningful for a battery, for which high output (improved rapid discharge performance) is desired, such as a battery for a drive power supply of a vehicle. In addition, since a cross sectional area of a terminal is preferably increased for the high output battery, the distance from the outer edge of the outer side resin member 60 to the contact portions (weld sections) 25 tends to be reduced. Also from this point, the technique disclosed herein can particularly preferably be applied to the battery for the drive power supply of the vehicle. Noted that the technique disclosed herein can preferably be carried out in a mode in which cross-sectional shapes of the bolt head section and the bolt receiving hole are those other than the rectangular shape (for example, the hexagonal shape or another polygonal shape).

A structure on a negative electrode side of the battery 10 in this embodiment is substantially the same as that on a positive electrode side except for a material of the negative electrode terminal 80. More specifically, one end of the negative electrode terminal 80 is connected to the negative electrode sheet 34, for example, by, resistance welding. This negative electrode terminal 80 includes: the negative electrode inner terminal 820 that is formed in the substantially same shape as the positive electrode inner terminal 420; and the negative electrode outer terminal 860. The negative electrode inner terminal 820 and the negative electrode outer terminal 860 are connected to each other by riveting a projected section (a rivet section) of the negative electrode inner terminal 820 to a first connection section of the negative electrode outer terminal 860. Similar to the positive electrode side, the above riveting is performed by interposing the inner side resin member 50, the lid body 22, and the outer side resin member 60 between the terminals 820, 860. The negative electrode outer terminal 860 is formed in a step shape that has the first connection section and a second connection section. It is configured that the bolt 670 is attached to a bolt insertion hole provided in the second connection section from below to above and that the connection member 112 for the external connection can be coupled (fixed) to the leg section 674 thereof. As a constituent material of the negative electrode inner terminal 820 and the negative electrode outer terminal 860, a metallic material with superb conductivity is preferred, and copper is typically used. The materials and the shapes of the inner side resin member 50 and the outer side resin member 60 are the same as those on the positive electrode side.

The lithium-ion secondary battery 10 with such a configuration can preferably be manufactured (constructed) generally in the following procedures, for example. More specifically, the lid body 22 with the above-described configuration is prepared, the inner side resin member 50 is set on an inner side surface thereof, and the outer side resin member 60 and the positive electrode outer terminal 460 are set on the outer side surface thereof. At this time, the head section 672 of the bolt 670 is housed in the bolt receiving hole 642 of the outer side resin member 60, and the positive electrode outer terminal 460 is arranged from an upper side thereof. The projected section 426 of the positive electrode inner terminal 420 is projected outward through the terminal pullout hole 242, the outer side resin member 60, and the positive electrode outer terminal 460, the projected section is riveted, and the positive electrode terminal 40 is thereby attached to the terminal pullout hole 242 of the lid body 22. In addition, similar to the positive electrode side, the negative electrode terminal 80 is attached to the terminal pullout hole 244 of the lid body 22. In this way, the positive electrode outer terminal 460, the negative electrode outer terminal 860, and the outer side resin members 60 are assembled to the lid body 22, and a lid body-terminal assembly, in which both of the electrode terminals 40, 80 and the lid body 22 are integrated, is obtained (a first process).

Next, the positive electrode terminal 40 and the negative electrode terminal 80 are joined (for example, welded) to both ends in an axial direction of the wound electrode body 30 with the above configuration. In this way, a lid body unit (a lid body-terminal-electrode body assembly), in which the above lid body-terminal assembly and the electrode body 30 are integrated, is obtained.

Then, the electrode body 30 is housed in the case body 21 from the opening thereof, the lid body 22 is attached to the opening, and the contact portions 25 of the lid body 22 and the case body 21 are welded by laser (a second process). This laser welding process can be performed in a state that the outer side resin member is temporarily compressed. Such a state can be realized by performing, for example, processing for reducing the water absorption rate of the outer side resin member, that is, processing for drying the outer side resin member.

The above drying processing can be processing in which an appropriate condition that can remove moisture from the outer side resin member is applied to the outer side resin member, the outer side resin member being stored under heated, pressure-reduced, and low-humidity atmosphere or the like. Although not particularly limited, the above heating condition can be set to be typically 40° C. or higher, preferably 50° C. or higher, and, for example, 60° C. or higher. A preferred upper limit temperature in the heating condition can differ by the material of the outer side resin member. Generally, the temperature of 150° C. or lower is appropriate, 120° C. or lower is preferred, and the temperature can be set to, for example, 100° C. or lower. In the above pressure-reducing condition, a pressure only needs to be equal to the atmospheric pressure or lower, and, for example, can be set to 0.9 times or lower, preferably 0.5 times or lower, and further preferably 0.2 times or lower of the atmospheric pressure. Of these conditions, one condition can independently be applied, or two or more conditions can be combined and applied. From a perspective of efficient and precise performance of the drying processing, a method for heating the outer side resin member under reduced pressure can preferably be adopted. It is preferred that the outer side resin member, which has been dried once, is retained under a condition for preventing a significant increase of the water absorption rate until the laser welding.

The water absorption rate ($A_B$) of the outer side resin member during the laser welding only needs to be in such a level that the outer side resin member can be expanded when the outer side resin member absorbs the moisture after the laser welding, and thus is not particularly limited. It is appropriate to set the water absorption rate ($A_B$) to be lower than the equilibrium water absorption rate ($A_E$) of the resin material, which constitutes the outer side resin member, at 23° C. and the relative humidity of 60% and not to fall below 1% of the equilibrium water absorption rate ($A_E$). The preferred water absorption rate ($A_B$) is 70% or lower of the equilibrium water absorption rate ($A_E$), further preferably 50% or lower, even further preferably 20% or lower, and particularly preferably 10% or lower (for example, 5% or lower).

A specific value of the preferred water absorption rate ($A_B$) can differ by the composition of the resin material, which constitutes the outer side resin member, or the like. For example, in the outer side resin member that includes the resin material with nylon 6 or nylon 66 being the base, the water absorption rate ($A_B$) of the outer side resin member during the laser welding is appropriately 0.5% or lower, preferably 0.2% or lower, further preferably 0.1% or lower, and even further preferably 0.05% or lower. Noted that the equilibrium water absorption rate ($A_E$) at 23° C. and the relative humidity of 60% is about 3.5% in the case of nylon 6 and 2.5% in the case of nylon 66.

A condition for the laser welding is not particularly limited. For example, as the laser beam, a YAG laser, a fiber laser, a carbon dioxide gas laser, a DOE laser, an LD laser, or the like can appropriately be adopted. Either continuous wave (CW) or pulse wave can be used. From a perspective of improved productivity, the continuous wave with which a welding speed can easily be increased has an advantage. In addition, since an amount of energy to be applied is generally increased to be larger in the welding by the continuous wave than the welding by the pulse oscillation, the application of the present invention to suppress the alteration of the outer side resin member is particularly meaningful. The welding by the continuous wave is typically performed in a mode that the laser is irradiated on a melted metal such that thermal conductivity from the melted metal is used to melt adjacent portions and then melted sections thereby gradually move along the contact portions 25. The technique disclosed herein can preferably be applied in a case where the lid body and the case body are welded by laser, under a condition of energy density of 0.2 to 100 kW/mm², for example. In addition, the technique disclosed herein can preferably be applied in a case where the lid body and the case body are welded by laser under a condition of the welding speed of 2 to 10 m/min.

After such laser welding is performed, the electrolyte is injected into the outer case 20 from an electrolyte injection hole 28 that is provided in the lid body 22. As the electrolyte, one that is the same as a nonaqueous electrolyte that has conventionally been used for the lithium-ion secondary battery can be used with no particular restriction. For example, an electrolyte can be used in which $LiPF_6$ is contained in concentration of approximately 1 mol/liter in a mixed solvent of ethylene carbonate and diethyl carbonate (for example, a mixed solvent with a volume ratio of about 1:1). Then, a sealing cap 29 is attached to the electrolyte injection hole 28 by welding or the like to seal the outer case 20. In this way, the lithium-ion secondary battery 10 can be manufactured (constructed).

In the technique disclosed herein, after the above laser welding is performed, the above outer side resin member is expanded (a third process). Typically, the water absorption rate of the above outer side resin member is increased to expand the outer side resin member. The above water absorption rate can be increased, for example, when the outer side resin member absorbs the moisture.

In the above third process, it is preferred that a water absorption rate ($A_C$) of the outer side resin member is increased to be larger than the water absorption rate ($A_B$) thereof during the laser welding by 0.5%. The outer side resin member preferably absorbs the moisture in such a manner that ($A_C$)−($A_B$) becomes higher than 0.5%. Accordingly, the outer side resin member can effectively be expanded. From such a perspective, ($A_C$)−($A_B$) is preferably 1% or higher, further preferably 1.5% or higher, and even further preferably 2% or higher.

A specific value of the preferred water absorption rate ($A_C$) can differ by the composition of the resin material, which constitutes the outer side resin member, or the like. For example, in the outer side resin member that includes the resin material with nylon 6 or nylon 66 being a base, the water absorption rate ($A_C$) after expansion can be higher than 1%, for example, preferably higher than 1.2%, and further preferably higher than 1.5%. The water absorption rate ($A_C$) may be higher than 1.7%, and further higher than 2%.

As processing for the absorption of the moisture by the outer side resin member, processing for supplying (causing contact of) water to (with) the above outer side resin member can preferably be adopted. Water in a liquid mode or water in a gaseous mode may be supplied to the above outer side resin member, and water in both of these modes may be supplied thereto. For example, when the battery after the laser welding is retained under the atmosphere at the relative humidity of 50% or higher (preferably 55% or higher, for example, 60% or higher), the outer side resin member can absorb the moisture and thus can be expanded. From a perspective of improved processing efficiency, the above processing for the absorption of the moisture is preferably performed in a higher temperature range than a room temperature. For example, the absorption of the moisture under a condition of, for example, 35° C. to 80° C., preferably 40° C. to 70° C., and for example, about 40° C. to 60° C. is effective.

The technique disclosed herein can preferably be applied to the square battery and the manufacturing method for the same, in which a minimum distance (the distance D1 in the example shown in FIG. 4) from the outer edge of the outer side resin member to the welded section is 5 mm or smaller, for example, 3 mm or smaller, in a state that the outer side resin member is expanded by the above moisture absorption or the like after the laser welding (for example, a state that the outer side resin member is actually used as a finished product). The effect of the application is particularly significant for the battery, the above distance of which is 2 mm or smaller (for example, 0.5 mm to 2 mm, further, 0.5 mm to 1.5 mm).

In the battery in which the minimum distance from the outer edge of the outer side resin member to the welded section is relatively small as described above, when the laser welding is performed in the state that the outer side resin member is temporarily compressed (that is, in the state before the above expansion), the minimum distance from the outer edge of the outer side resin member to the welded section can be increased during this laser welding. Thus, an influence of the laser beam on the outer side resin member (the alteration due to the heat and the like) can be suppressed. When the outer side resin member is expanded after the welding, an insulation distance of the outer side resin member can be extended in comparison with that before the expansion. In this way, it is possible to preferably satisfy both of suppression of the influence of the laser beam during the laser welding and securing of the insulation distance (particularly, a creeping distance) during actual use of the battery.

In this embodiment, regarding the width direction of the lid body 22 shown in FIG. 4, the distance D1 from the outer edge of the outer side resin member 60 to the welded section 25 after the above expansion is 1 mm. In addition, regarding the longitudinal direction of the lid body 22, a distance D2 from the outer edge of the outer side resin member 60 to the welded section 25 after the above expansion is 2.8 mm. Thus, in this embodiment, the minimum distance from the outer edge of the outer side resin member to the welded section is 1 mm.

Noted that timing to perform the drying processing of the above outer side resin member is not limited to timing immediately before the above second process, and the drying processing only needs to be performed before the above second process. For example, the above drying processing can be performed before the first process. That is, the process of obtaining the lid body-terminal assembly can preferably be performed in the state that the outer side resin member is temporarily compressed. When the head section of the bolt is inserted in the bolt receiving hole in the state that the outer side resin member is compressed as described above, interference between the head section of the above bolt and the bolt receiving hole, which is caused by an manufacturing error or the like, is unlikely to occur, and thus assemblability of the bolt can be improved. When the outer side resin member is expanded after the laser welding, clearance between the head section of the bolt and the bolt receiving hole is reduced. In this way, a rotation stopper function of the bolt by the above bolt receiving hole can appropriately be exerted. As a result, an operation to attach the nut to the above bolt and fasten the connection member with an external circuit or an electrode of another adjacent battery, for example, can further reliably be performed.

According to the technique disclosed herein, it is possible by using the volume change of the outer side resin member to improve the assemblability of the bolt and to appropriately perform the rotation stop of the bolt.

Figure 7:
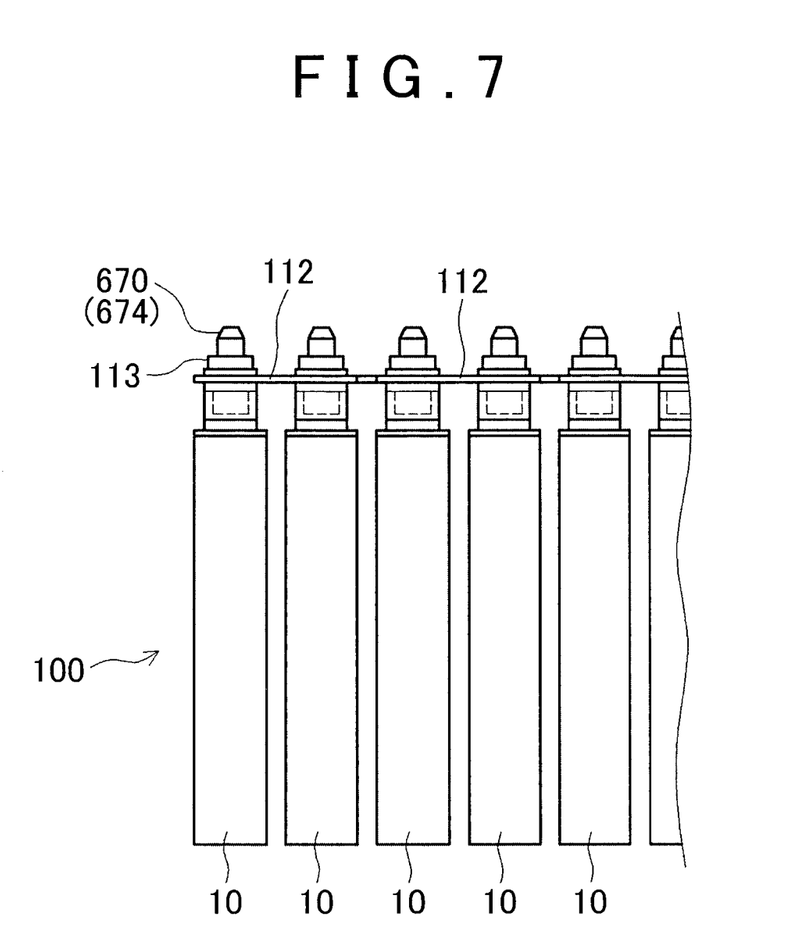
FIG. 7 is a side view of a portion of a battery pack according to the one embodiment.
Figure 8:
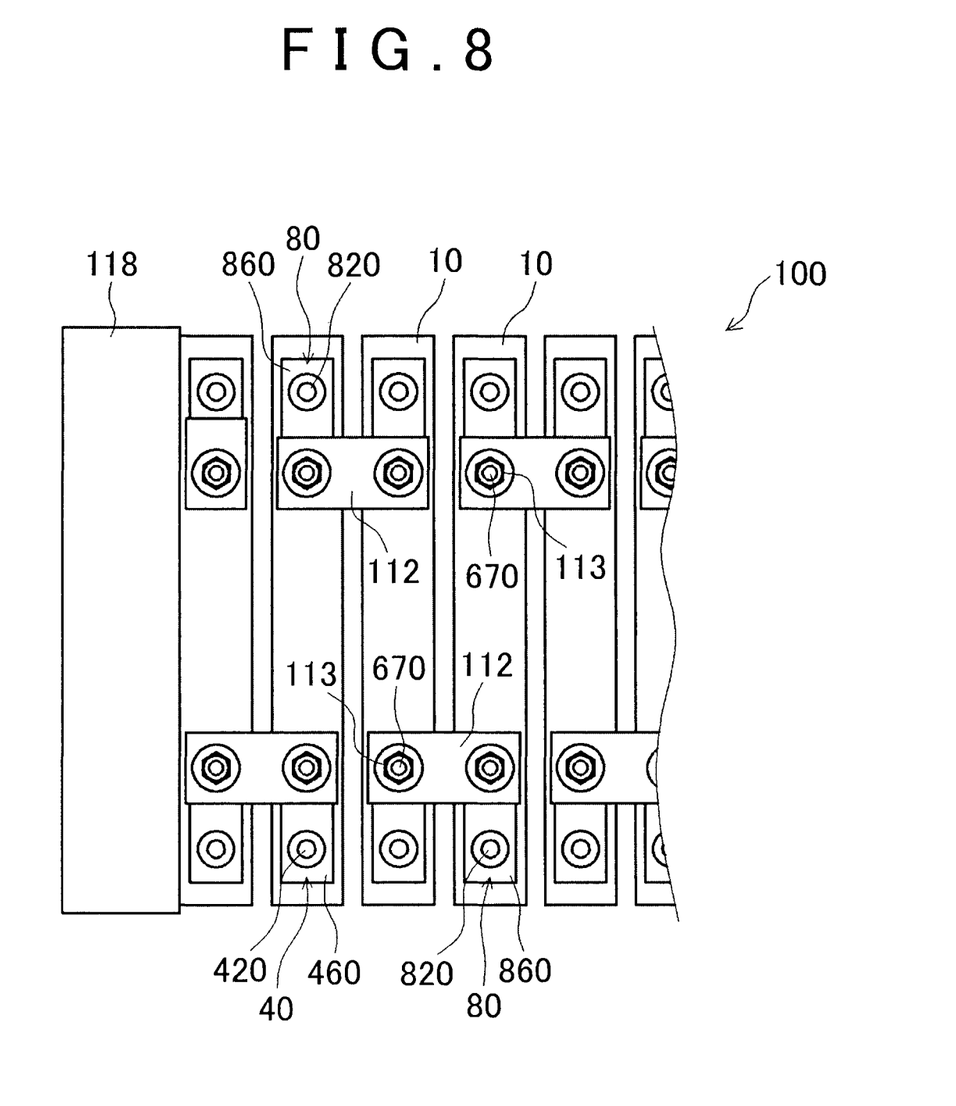
FIG. 8 is a plan view of a portion of the battery pack according to the one embodiment.

A description will be made on one configuration example in which the lithium-ion secondary battery 10 with such a configuration is used as a single battery and a battery pack that includes a plurality of the single batteries is used. As shown in FIGS. 7, 8, this battery pack 100 is arranged such that every other one of plural pieces of the lithium ion secondary batteries (the single batteries) 10 is inverted to alternately arrange the positive electrode terminals 40 and the negative electrode terminals 80 of the batteries, and is also arranged in a direction (a laminating direction) that wide surfaces of the outer cases 20 face each other. The plural pieces may typically be 10 or more, preferably be 10 to 30, and, for example, 20. A cooling plate in a specified shape (not shown) is interposed between each two of the arranged single batteries 10. The cooling plate that is made of a metal with high thermal conductivity, lightweight and rigid polypropylene, or another synthetic resin is preferred.

As shown in FIG. 8, a pair of end plates (constraining plates) 118 is arranged on both ends of the above-arranged single batteries 10 (FIG. 8 only shows one end side of the above arrangement). The above-arranged single batteries 10 are constrained by a constraining belt (not shown) for fastening, which is attached to stretch across both of the end plates, such that a prescribed constraining pressure is applied thereto. Then, in the adjacent single batteries 10, the positive electrode terminal 40 of the one and the negative electrode terminal 80 of the other are electrically connected by the connection member (a bus bar) 112. In detail, the bolt leg sections 674 that are projected from the outer terminals of the adjacent single batteries 10 penetrate through holes that are provided on both ends of the connection member 112, and are fastened with the nuts 113 from above. Accordingly, the positive electrode terminal 40 of the one and the negative electrode terminal 80 of the other can electrically be connected. As described above, since the single batteries 10 are connected in series, the battery pack 100 at a desired voltage is constructed. For the construction of the battery pack with such a configuration, it is particularly meaningful that the rotation stop of the bolt 670 can appropriately be performed during fastening of the nut 113 from perspectives of productivity, quality stability, and the like.

The description has been made so far on the preferred embodiment of the present invention. It is needless to say that the present invention is not limited to such a description but various modifications can be made thereto.

For example, the third process in which the outer side resin member is expanded after the laser welding only needs to be a process in which the outer side resin member is expanded so that the distance between the outer edge of the outer side resin member and the welded section is reduced. The third process is not limited to the process in which the outer side resin member absorbs the moisture for the expansion (increase in the volume). For example, a resin material that contains a shape memory resin may be used as the constituent material of the outer side resin member. The laser welding may be performed in a state that the outer side resin member is deformed such that the distance between the outer edge thereof and the welded section (an outer edge of the lid body) is increased. Then, the above outer side resin member may be heated to a shape restoring temperature, and the shape of the outer side resin member may be restored such that the outer edge thereof is expanded to the welded section side.

In addition, the resin material that constitutes the outer side resin member can contain an arbitrary component other than the resin component. As a preferred example of such an arbitrary component, inorganic fiber can be raised. For example, the outer side resin member that contains: a resin matrix including the above resin component; and the inorganic fiber that exists by being scattered in the resin matrix can preferably be adopted. A content of the inorganic fiber can be, for example, 5 to 60% by mass of the whole mass of the outer side resin member, about 15 to 60% by mass is preferred in general, and about 30 to 60% by mass (for example, about 45 to 60% by mass) is further preferred. As the inorganic fiber, glass fiber, ceramic fiber, carbon fiber, metal fiber, or the like can be used. As the inorganic fiber, glass fiber is particularly preferred. At least 50% by mass of the inorganic fiber, which is contained in the outer side resin member, is preferably arranged such that a fiber axis direction of the inorganic fiber is in a parallel state with the outer surface of the lid body. The outer side resin member, in which the inorganic fiber is arranged as described above, is preferred because the outer side resin member can effectively be reinforced by the above inorganic fiber, and also because the inorganic fiber is less likely to interfere with expansion/compression of the outer side resin member (particularly, expansion/compression in the direction along the outer surface of the lid body). Noted that the above "parallel state" includes a case where it can be considered as being substantially parallel, in addition to a case of being completely parallel, as long as the effect of the invention can be exerted. Typically, such a case includes a case where a crossing angle of the inorganic fiber and the outer surface of the lid body is at least 0 degree and at most 30 degrees.

In addition, the technique disclosed herein is not limited to the lithium-ion secondary battery, but can widely be applied to various types of a primary battery, a secondary battery, a sealed battery, an unsealed battery, a battery that contains an aqueous electrolyte, a battery that contains a non-aqueous electrolyte, and the like as well as to manufacturing thereof. In these batteries, the mode of the electrode body is not limited to the above-described wound type but may be another mode such as a laminated type.

The invention claimed is:

1. A manufacturing method for a square battery, the square battery including a case body and a lid body welded to the case body, the manufacturing method comprising:
   a first process in which an outer terminal and an outer side resin member that separates the outer terminal and an outer surface of the lid body are assembled to the lid body;
   a second process in which a laser beam is irradiated from the outer surface side of the lid body to weld the lid body to the case body by laser after the first process; and
   a third process in which the outer side resin member is expanded after the second process.

2. The manufacturing method for according to claim 1, wherein
   the third process includes a process in which the outer side resin member is expanded by absorbing moisture.

3. The manufacturing method according to claim 1, further comprising:
   a forth process in which the outer side resin member is dried before the second process.

4. The manufacturing method according to claim 2, wherein
   the third process includes a process in which the moisture is absorbed to the outer side resin member such that a water absorption rate of the outer side resin member increases from 1% or lower to higher than 1% on a mass basis.

5. The manufacturing method according to claim 1, wherein
the outer side resin member includes a resin material with a polyamide resin as a base.

6. The manufacturing method according to claim 1, wherein
the outer side resin member has a recess, the outer terminal has a connection section,
the connection section is arranged in a manner to correspond to the recess in the first process.

7. The manufacturing method according to claim 1, wherein
the outer side resin member is arranged inside a contact portion of an outer edge of the lid body and the case body, and
the outer sire resin member is expanded so that a distance between an outer edge of the outer side resin member and the contact portion is reduced in the third process.

8. The manufacturing method according to claim 1, wherein
the outer side resin member has a bolt receiving hole,
a head section of a bolt is inserted in the bolt receiving hole in the first process, and
the head section is smaller than the bolt receiving hole in a cross section that is perpendicular to an axis of the bolt.

9. The manufacturing method according to claim 8, wherein
the head section and the bolt receiving hole define clearance between each other in the cross section that is perpendicular to the axis of the bolt,
the clearance in the third process is smaller than the clearance in the first process.

* * * * *